United States Patent [19]

Leo, Sr.

[11] Patent Number: 4,777,749
[45] Date of Patent: Oct. 18, 1988

[54] LIGHTED DISPLAY

[75] Inventor: Daniel W. Leo, Sr., New York, N.Y.

[73] Assignee: Ledan, Inc., New York, N.Y.

[21] Appl. No.: 611,622

[22] Filed: May 18, 1984

[51] Int. Cl.$^4$ ............................................. G09F 13/18
[52] U.S. Cl. ........................................ 40/546; 40/615
[58] Field of Search .................... 40/546, 542, 615; 434/410; 362/26, 27, 31, 32

[56] References Cited

U.S. PATENT DOCUMENTS

| | | | |
|---|---|---|---|
| 1,816,220 | 7/1931 | Hotchner | 40/546 |
| 1,843,980 | 2/1932 | Hotchner | 40/546 |
| 1,931,742 | 10/1933 | Scharringhausen | 40/546 |
| 2,548,126 | 4/1951 | Sholkin | 40/546 |
| 2,917,838 | 12/1959 | Neugass | 40/546 |
| 3,349,511 | 10/1967 | Aronoff | 40/546 |
| 4,059,916 | 11/1977 | Tachihara et al. | 40/546 |

FOREIGN PATENT DOCUMENTS 392628  5/1933  United Kingdom ................ 40/546

Primary Examiner—Robert Peshock
Assistant Examiner—J. Hakomaker
Attorney, Agent, or Firm—Charles E. Temko

[57] ABSTRACT

An edge lighted display in which light is transmitted through a translucent planar panel to be refracted by the presence of indicia, such as a crayon marking to provide a luminescent appearance. In the disclosed embodiment, the translucent panel which is made of synthetic resinous materials is provided with a thin coating on an outer surface thereof of a harden silicate material, whereby light rays pass in the plane of the junction between the outer surface of the panel and the inner surface of the coating prior to refraction for improved brilliance.

3 Claims, 1 Drawing Sheet

LIGHTED DISPLAY

BACKGROUND OF THE INVENTION

This invention relates generally to the field of edge lighted displays, and more particularly to an improved display panel for use therewith in which the refractive ability of the display panel has been significantly improved over that of corresponding prior art devices.

Edge lighted displays, which feature a translucent panel to which light rays are introduced along an edge thereof to be refracted at a point where a substance placed upon a planar surface will be brightly illuminated are well known in the art.

The earliest example of this art of which I am aware is described in the U.S. Pat. No. 1,146,361 to Spencer, granted July 13, 1915.

The Macau Pat. No. 2,566,458 of Sept. 4, 1951 discloses the use of a background coating of lamp black and a separate coating of purpurine gold to improve contrast, but not the intensity of light.

These earlier teachings employ a translucent panel of glass, although it is also known in the art to employ synthetic resinous material. While acceptible luminescent effects have been obtained with such prior art devices, the creation of a "Neon-like" quality has been unobtainable.

SUMMARY OF THE INVENTION

Briefly stated, the invention contemplates the provision of an improved edge lighted display device of the class described which offers increased brilliance of illumination of applied indicia of a translucent nature, such as a wax crayon or the like. This effect is obtained by providing a translucent display panel of acrylic material, the outer surface of which has an applied coating of a hardened transparent silicate material. The light rays entering at the edge of the panel also travel in the plane of the outer surface of the panel, and beneath the coating, so that when refracted by the translucent message bearing material brillance of outline is obtained to a degree previously unknown in the art. By using a coating material substantially harder than the synthetic resinous panel, improved durability is also obtained.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
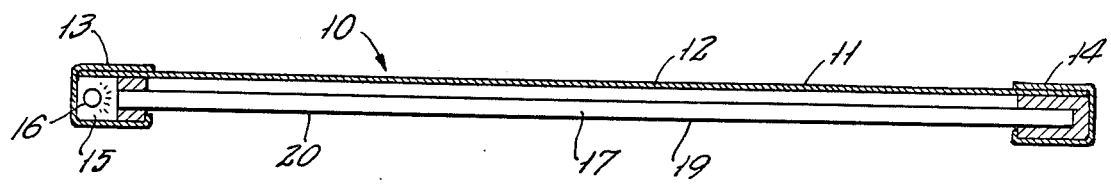
FIG. 1 is a sectional view of an embodiment of the invention.

In accordance with the invention, the device generally indicated by reference character 10 includes a rigid frame element 11, most conveniently formed as a two piece injection molding of synthetic resinous material. The element includes a rear wall 12 and peripheral members two of which are indicated by reference characters 13 and 14 which define a hollow recess 15 accomodating an illumination source 16 which may be either a lumiline or fluorescent tube.

Supported between the peripheral members 13 and 14 is a translucent panel 17, which may be of polished glass, but which is preferrably of acrylic material in the interest of light weight and lack of frangibility. The outer surface 19 thereof is provice with a transparent coating 20 of a hardened silicate material ranging in thickness from 0.003 to 0.005 inches. acrylic sheets provided with such coating are known in the art, the coating normally being applied for purposes of protecting the surface 19 from scratching with repeated use. Suitable panels are available at the present time under the trademark ACQUA VU-A, and are marketed by Swedlow, Incorporated of 12122 Western Ave., Garden Grove, CA.

Figure 2:
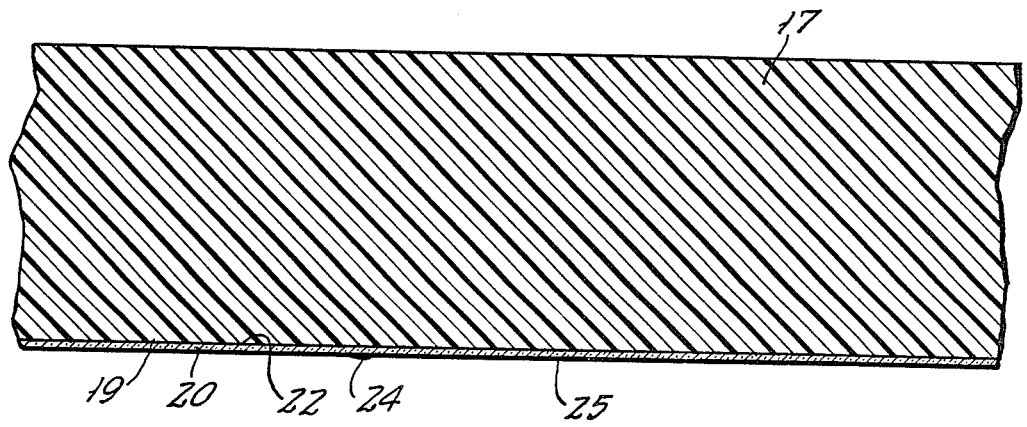
FIG. 2 is an enlarged fragmentary sectional view corresponding to the lower central part of FIG. 1.

Referring to FIG. 2 in the drawing, the abutment of the inner surface 22 of the coating 20 and the outer surface 19 of the panel 17 forms a plane which transmits the passage of light rays more readily than either the panel 17 or the coating 20 alone. Thus, when an indicia in the form of a crayon mark 24 or the like is placed on the outer surface 25 of the coating 20 the refractive effect is superior to that obtainable when only the panel 17 in uncoated form is used. While I have not been able to arrive at a theory of operation as to why a superior result is obtained, it does appear that it may be due to superior transmission of the light rays at the plane of meeting between the panel and the coating, and the fact that once refracted, these light rays need only penetrate the thin coating, without having to pass through the mass of material comprising the panel 17.

I wish it to be understood that I do not consider the invention limited to the precise details of structure shown and set forth in this specification, for obvious modifications will occur to those skilled in the art to which the invention pertains.

I claim:

1. In an edge-lighted display device including a translucent panel, and a source of illumination position to introduce rays of light thereinto in the plane of said panel to be refracted by the presence of a translucent display applied to an outer surface of said panel, the improvement comprising: said panel having a thin translucent coating on an outer surface thereof to create a planar path between an inner surface of the coating and said outer surface of the said panel for the passage of light rays to provide increased luminescence in areas of said panel where light rays are refracted.

2. The improvements in accordance with claim 1, in which said translucent coating varies in thickness between 0.003 and 0.005 inches.

3. The improvements in accordance with claim 1, in which said coating comprises a hardened silicate material, and said panel is formed of acrylic material

* * * * *